UNITED STATES PATENT OFFICE.

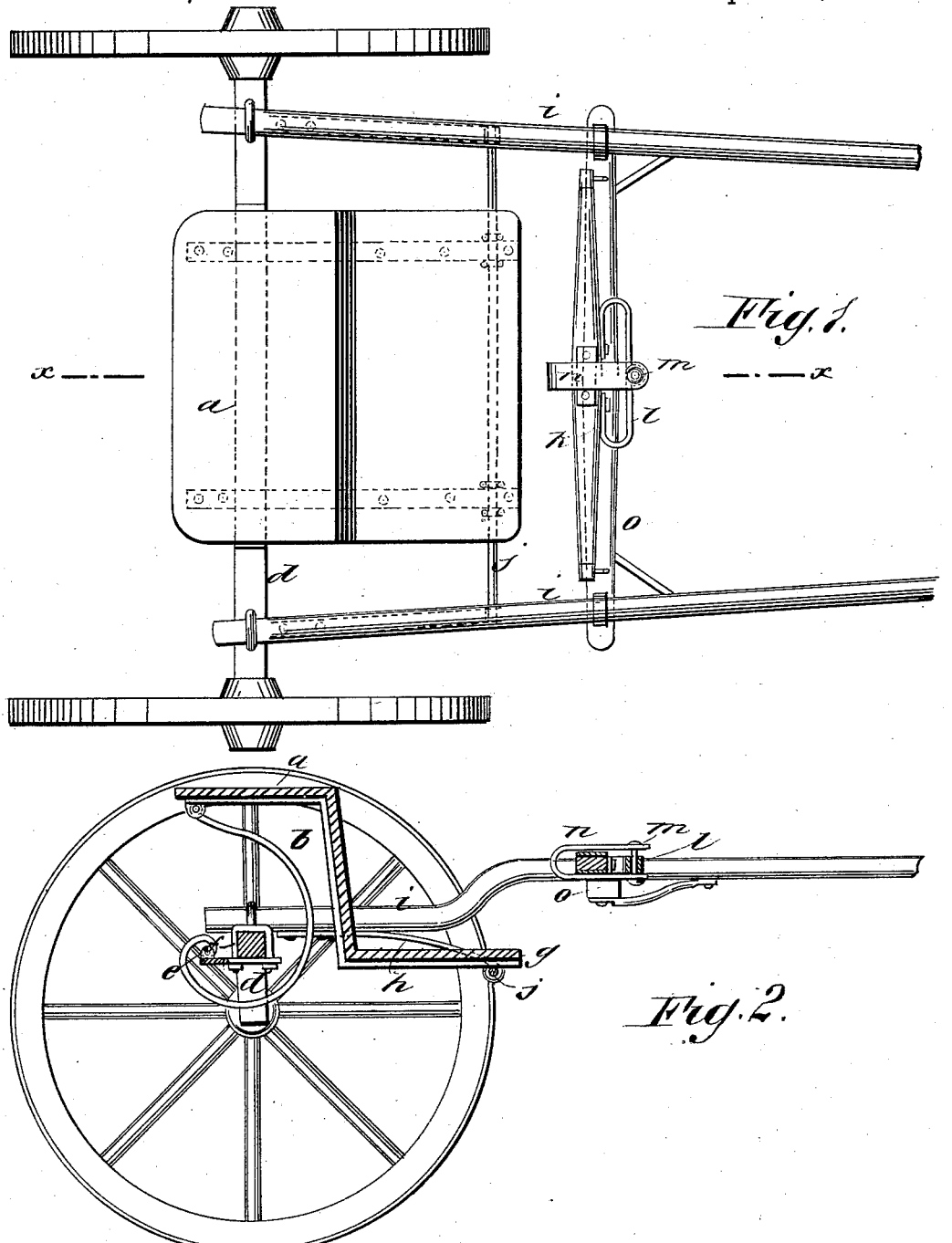

JOHN WEILER, OF GRIGGSVILLE, ILLINOIS.

ROAD-CART.

SPECIFICATION forming part of Letters Patent No. 285,189, dated September 18, 1883.

Application filed July 20, 1883. (No model.)

*To all whom it may concern:*

Be it known that I, JOHN WEILER, of Griggsville, in the county of Pike and State of Illinois, have invented a new and Improved Road-Cart, of which the following is a full, clear, and exact description.

My invention consists of an improved arrangement of springs for mounting the seat on the cart, which arrangement is designed to be better adapted to neutralize the swing of the shafts by the horse than other arrangements; and the invention also consists of a spring contrivance for connecting the whiffletree to the shafts to neutralize the jerks of the horse in pulling the cart, all as hereinafter fully described.

Reference is to be had to the accompanying drawings, forming part of this specification, in which similar letters of reference indicate corresponding parts in both the figures.

Figure 1 is a plan view of my improved road-cart, and Fig. 2 is a sectional elevation of Fig. 1 on the line $x\,x$.

I connect the back of the seat $a$ to the upper ends of the C-springs $b$, which extend downward forward of the axle $d$, under it, and upward again to a point a suitable distance backward of the axle for properly balancing the seat thereon, where the springs connect to shackles $e$, about on a level with the under side of the axle, which is cranked upward for allowing the springs to so pass under it without being too low, and the shackles $e$ are suitably connected to the axle by clips $f$. The front of the foot-board $g$ is supported by rod $j$ on the flat springs $h$, which extend backward along the shafts $i$, and are attached to them near the axle; or they may be attached directly to the axle, if preferred, thus virtually supporting the seat directly on the axle, where it is not subject to the vertical vibrations of the shafts, and so that the rocking motions of the axle caused by the shafts will be largely neutralized by said springs, making a steadier and easier riding cart than others now in use.

To prevent the unpleasant jerking effect of the pull of the horse on the cart, I propose to connect the whiffletree $k$ to the bow-spring $l$, which is pivoted at $m$ in the forward end of a yoke, $n$, in which it turns on the pivot as the whiffletree is required to turn, and in which yoke the whiffletree is supported and guided, said yoke being attached to the cross-bar $o$, connecting the shafts.

The springs $b$ may be bolted or riveted to the under side of the seat; but I prefer to connect them by shackles $p$, as represented in the drawings, as the shackles afford better and more free action.

I do not abandon or dedicate to the public any patentable feature set forth herein and not hereinafter claimed, but reserve the right to claim the same either in a reissue of any patent that may be granted upon this application or in any other applications for Letters Patent that I may make.

Having thus fully described my invention, I claim as new and desire to secure by Letters Patent—

1. The flat springs $h\,h$, connected in front by a bar, $j$, and attached at the rear to the under side of shafts, for the purpose of supporting the foot-board, as shown and described.

2. The combination, with the cross-bar $o$ and whiffletree $k$, of the yoke $n$, attached to the cross-bar, and the bow-spring $l$, pivoted at $m$ to said yoke, as and for the purpose specified.

JOHN WEILER.

Witnesses:
 THEODORE K. BALL,
 N. T. PHILLIPS.